June 2, 1942.  T. H. MORGAN  2,285,348
MATERIAL SEPARATOR APPARATUS
Filed June 26, 1940  4 Sheets-Sheet 1
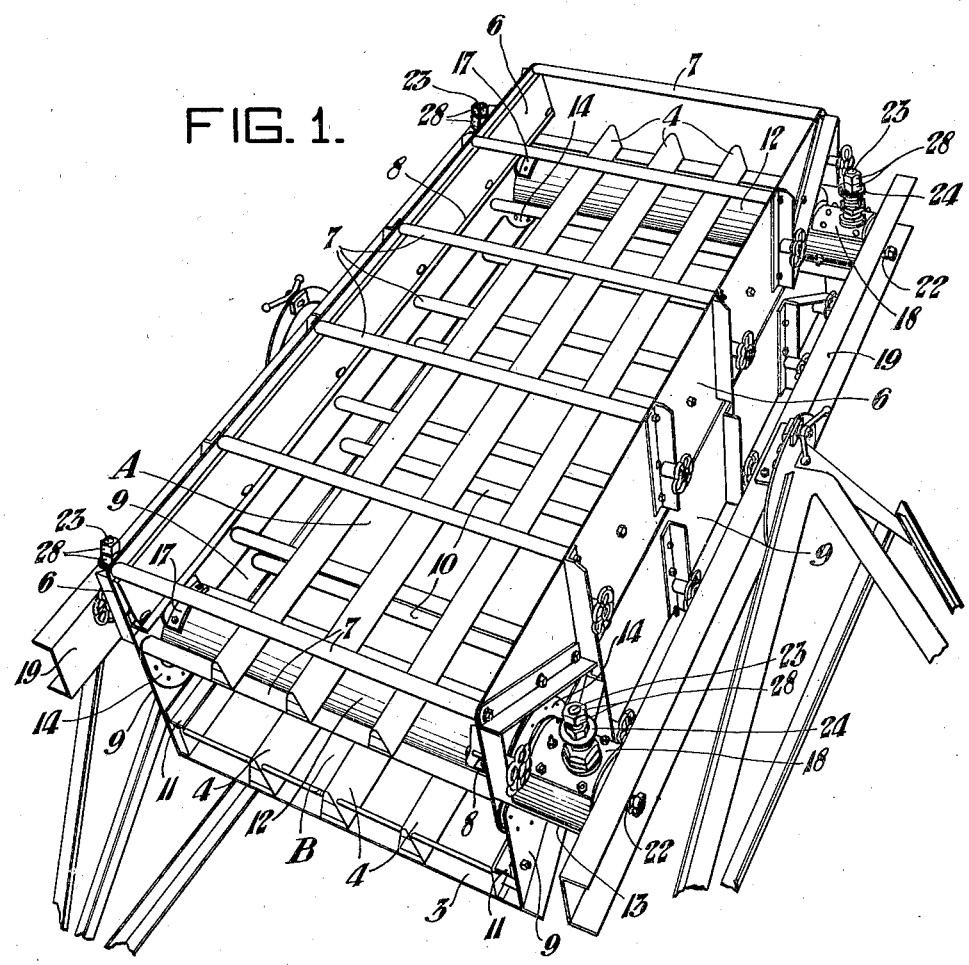
INVENTOR
T. H. Morgan
BY W. G. Doolittle
ATTORNEY June 2, 1942.   T. H. MORGAN   2,285,348
MATERIAL SEPARATOR APPARATUS
Filed June 26, 1940   4 Sheets-Sheet 2

INVENTOR
T. H. Morgan
BY W. G. Doolittle
ATTORNEY

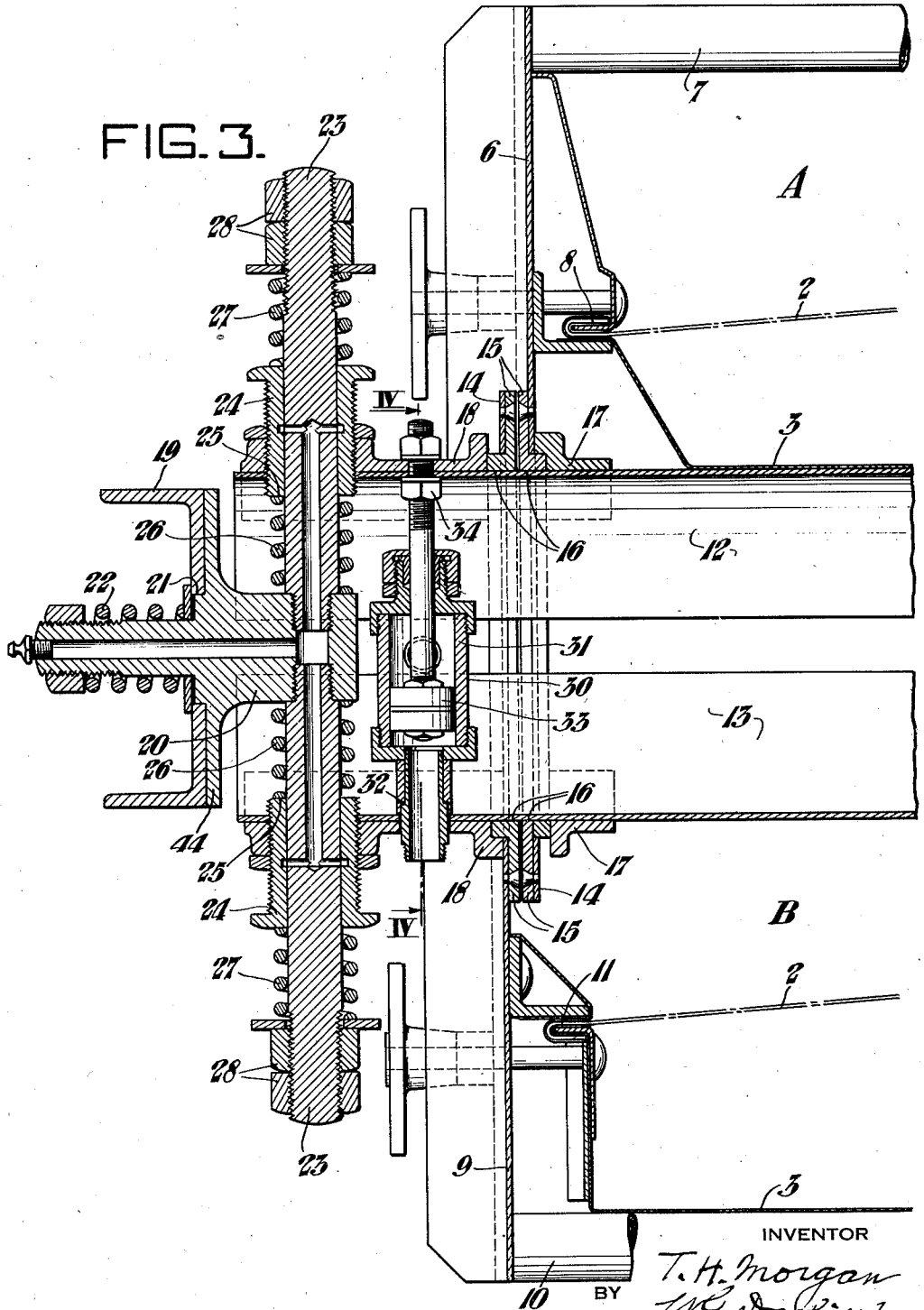

Patented June 2, 1942

2,285,348

UNITED STATES PATENT OFFICE 2,285,348

MATERIAL SEPARATOR APPARATUS

Thomas Hubbard Morgan, Kittanning, Pa., assignor to S. S. Bruce, H. C. Oliver, Pittsburgh, and T. Hubbard Morgan, Kittanning, Pa., trustees Application June 26, 1940, Serial No. 342,497

9 Claims. (Cl. 209—315)

This invention relates to improvements in material separator apparatus of the character employed for the separation and grading of ores, minerals, grains and other materials.

It is an object of the present invention to provide a separator apparatus having controlled positive high frequency vibratory action and a simplified flexibility of adjustment of the plane of vibratory motion thereof.

I further have in view to provide for a uniformity of separation throughout the working surface of the device under the varying conditions and loadings encountered in practice.

Another object is to provide an improved suspension for the separator device, whereby to attain increased efficiency in the application and control of the separating action.

My invention also contemplates additional advantages through the embodiment of the principal features thereof in a double-deck separator or screen for related positive dual separating action without the necessity of heavy inefficient mechanical linkage, and a structure having a minimum of parts subjected to the destructive forces of crystallization under frequency of the applied vibrations.

Additional objects and advantages will become apparent from the following description, taken in connection with the accompanying drawings, wherein:

Fig. 1 is a perspective view of a double-deck screen embodying my invention, with the screen cloths removed;

Fig. 3 is an enlarged sectional view of a portion of Fig. 2, particularly showing a spring suspension and its associated vibrating unit;

Figure 2:
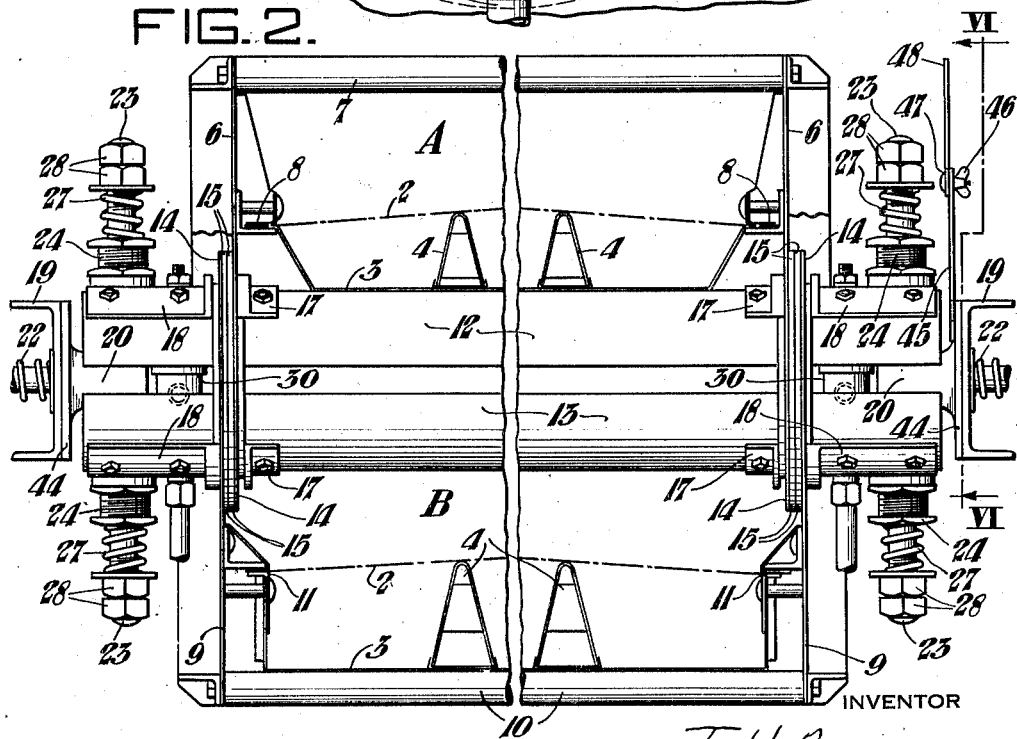
Fig. 2 is an end view thereof.

Referring to the drawings, I have illustrated my invention as embodied in a double-deck screen, it being understood however, that the same is merely by way of example and that the invention is not to be limited thereto, as the features thereof may be employed in other separator devices. In the double-deck screen shown, A designates an upper deck and B the lower deck thereof, each having a transverse conventional material-receiving element such as a screen cloth indicated at 2 in Figs. 2 and 3.

As will be readily understood, the material to be screened may be supplied to the upper element or cloth 2 and the separated fines again treated by the lower cloth, or the material may be separately applied to the upper and lower decks, in which case conveying or collecting pans 3 may be provided beneath each cloth element 2. 4 designates spaced longitudinal struts or supports for the screen cloths 2.

The deck A essentially includes longitudinal side members or plates 6 spaced apart and braced by intervening tie rods or braces 7 providing a frame for the material-receiving element, said members 6 having longitudinal supporting attachments 8 for the edges of said upper element or screen cloth 2.

Likewise, the deck B includes a frame having longitudinal side members 9, transverse intervening tie rods 10, and edge supports 11 for the lower screen element or cloth 2.

Said decks A and B are mounted for relative vertical reciprocating movement, the side members 6 of the deck A overlapping the members 9 of the lower deck B for telescoping movement thereof.

12 and 13 designate pairs of transverse members supporting the decks A and B at their end portions, each member 12 of the upper deck being transversely alined with a corresponding member 13 of the lower deck. The members 12 and 13 are preferably of semi-tubular form, the same extending laterally beyond the deck side members at the four corners of the device for spring suspension attachment, as hereinafter described.

For supporting and rotating engagement of the members 12 and 13 and their respective side members 6 and 9 of the screen decks, said side members are provided with overlapping ring extensions 14 adjacent their ends, each having a collar 15 secured thereto, said collars being bored at 16 to permit the extension of the end portions of members 12 and 13 therethrough.

Collars 15 of the innermost side members 6 are engaged by abutting collar segments 17, and the outermost side members 9 are similarly engaged by abutting segments 18, said segments 17 and 18 securing the members 6 to the supporting members 12 and the members 9 to the supporting members 13, while permitting rotation of the members 12 and 13 in the said ring bearings or collars 15.

19 designates a pair of beams or outriggers constituting cradle members for cradling the device, said cradle members extending longitudinally along opposite sides of the screen and having spaced inwardly extending rotatable suspension members 20 adapted to extend centrally within the outer portions of the deck supports 12—13. Members 20 have rotatable engagement 21 with the outriggers 19, and are frictionally held therein by spring attachments 22. Said outriggers are preferably centrally pivotally connected on suitable supporting frames as shown. The members 20 extend centrally between the members 12 and 13 at each of the four corners of the apparatus, and each mounts a pair of alined stationary guide rods 23 extending on opposite sides of the member 20 and at right angles to the transverse supporting members 12 and 13. 24 are bearing bushings threaded into the members 12 and 13 and their attached segment members 18, said bushings having sliding engagement with the guides 23 and providing an adjustable abutment 25 for springs 26 disposed on the guides between said abutments and the members 20.

Springs 27 are positioned on the guides 23 beyond the bushings 24, the outer ends of the guides having adjustment nuts 28 for adjusting the tension of said springs.

Thus, springs 26 and 27 may be adjusted to resiliently support the members 12 and 13 by the opposed pressures of said springs whereby the supporting members 12 and 13 and their respective screen decks A and B may be independently and properly suspended for vibratory action upon full-floating multiple spring suspensions.

Figure 4:
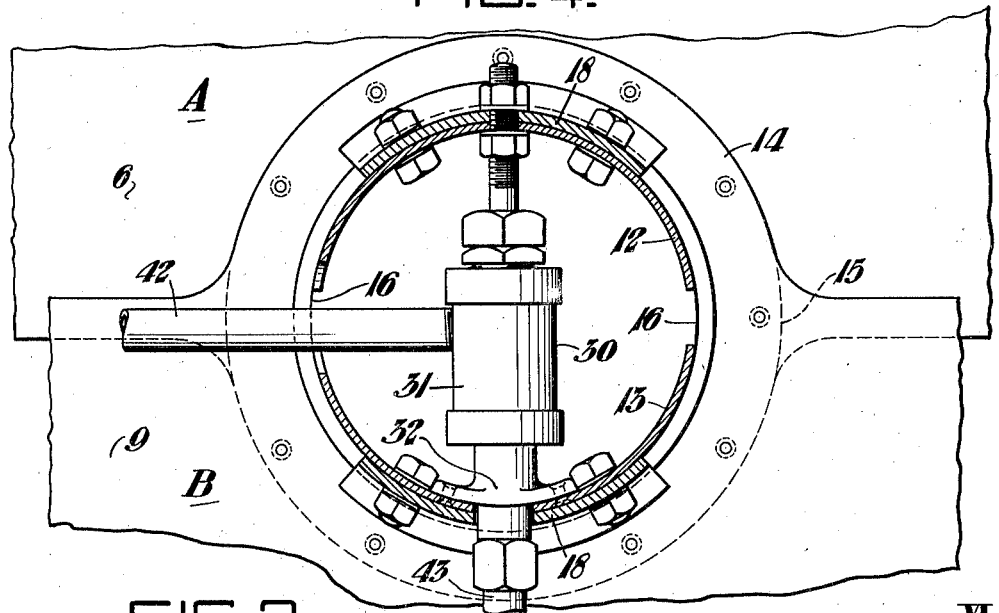
Fig. 4 is a cross-section taken on the line IV—IV of Fig. 3.

For imparting a reciprocatory vibrating movement to the screen, I provide a separate power cylinder or vibrating unit adjacent each spring suspension, one of said units being illustrated in detail in Figs. 3 and 4, and being generally designated 30.

Each power unit 30 includes a cylinder 31 having attachment at 32 with one of the supporting members 13, and a piston 33 having connection 34 by its piston rod with the other supporting member 12. The attachment of each cylinder and piston as described provides for relative movement thereof along a line parallel to the common axis of the adjacent spring suspension guides 23.

It will be noted that due to the provision and the relation of the guides and the vibrating units, a straight-line vibratory motion is effected and assured irrespective of the frame angle, and that the plane of vibration of the screen frame or decks may be varied by turning members 20.

Thus, by motivating the piston and cylinder units 30, a direct reciprocation may be imparted to the screen decks A and B through their supporting members 12 and 13, the said decks alternately moving toward and away from each other on their spring suspensions.

Any suitable means may be employed for supplying the vibrating power to the screen device, one form of such drive being illustrated in detail in my copending application of even date, Serial No. 342,498.

In such drive, a high frequency vibratory movement is transmitted hydraulically to the several power units 30 for multiple application of the desired vibration at spaced points of the screen in synchronism, whereby to completely vibrate all parts of the screen with uniformity.

For supplying the main source of vibratory power, I prefer to employ a pneumatic vibrator of the character shown in my prior United States Patents Nos. 2,119,285 and 2,196,224, which vibrators are capable of high frequency operation and are readily adaptable for connection by their pistons with external loading.

Figure 5:
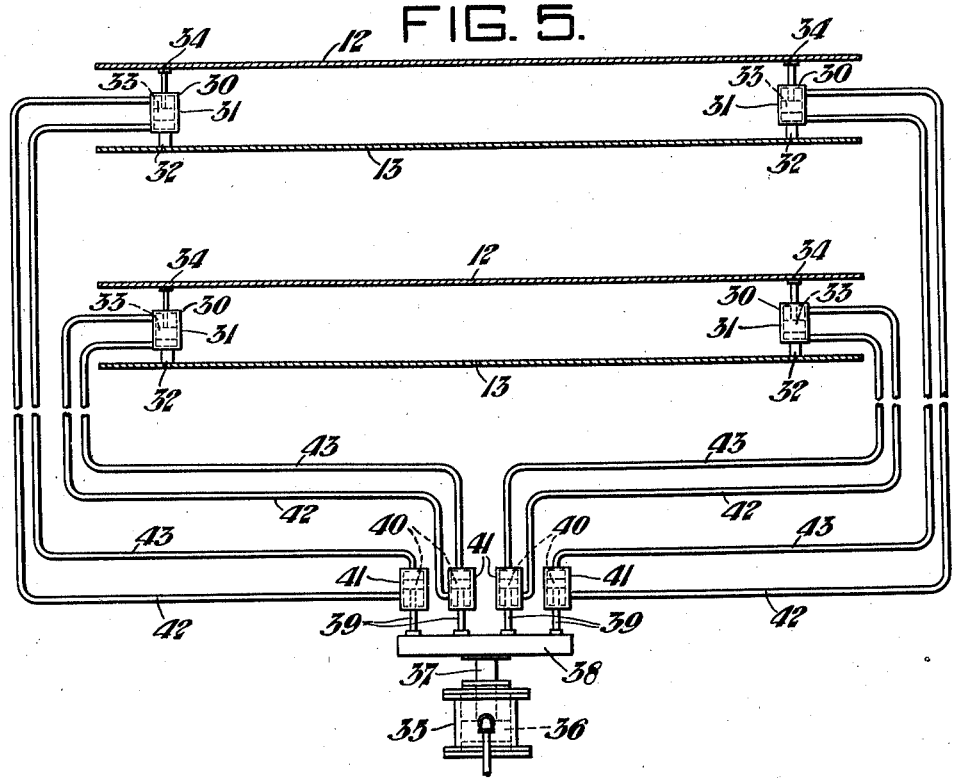
Fig. 5 is a diagrammatic plan view of one form of a vibrator drive unit for operating the screen.

Such a vibrator is diagrammatically indicated at 35 in Fig. 5, and includes a piston 36 having its rod 37 secured externally to a drive-bar 38 movable with said piston and rod. Drive-bar 38 mounts a series of piston rods 39 having pistons 40 reciprocable in stationary hydraulic cylinders 41.

Each hydraulic cylinder 41 is connected in fluid circuit with a power unit cylinder 31 by suitable piping in such a manner that pistons 33 and 40 of the respective cylinders are continuously in contact with a pair of fluid columns designated by their respective conduits 42 and 43 containing fluid, as for example, a light turbine oil.

Each cylinder 31 and 41 is ported on either side of the normal range of its piston travel so that one fluid column 42 extends between an end of each piston 33 and 40, and the other fluid column 43 extends between the other ends of said pistons, thus providing a complete series circuit for movement in either direction of fluid and pistons.

Assuming the cylinder of vibrator 35 to be fixed when the vibrator is in operation, the piston thereof will vibrate the drive bar 38 and impart a corresponding reciprocating vibratory movement to the fluid columns 42 and 43 by means of pistons 40. Since the cylinders 31 of units 30 are connected to the supports 13 of the screen decks, and their pistons 33 to the members 12, the said pistons 33 and cylinders 31 will have a relative and opposite reciprocating vibratory movement to vibrate the screen decks on their full-floating spring mountings.

When the screen is assembled, the several spring suspension means and cylinders 30 at the four corners of the device are alined, and at one side thereof the flanges 44 of rotatable members 20 are provided with radial arms 45 having terminal connection 46 with a common adjusting bar 47. The arms 45 are rigidly secured to flanges 44 and connections 46 are adjustable to securely clamp the arms 45 to the bar 47.

Figure 6:
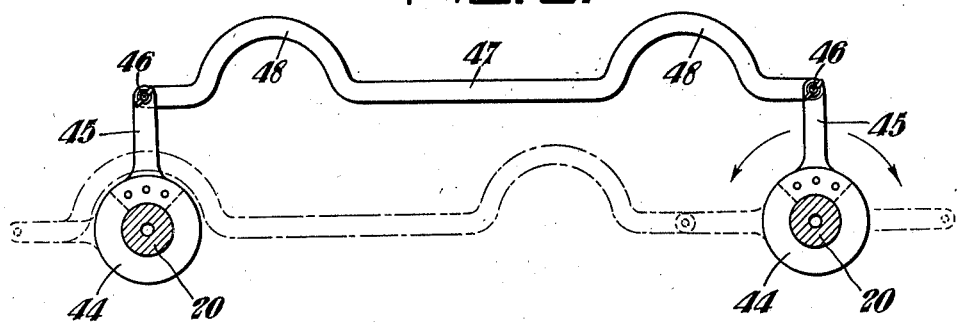
Fig. 6 is a detail view on the line VI—VI of Fig. 2, showing a means for adjusting the plane of vibration of the screen.

By loosening connections 46, the members provided with the arms 45 may be rotated to vary the plane of vibration of the screen decks by the bar 47, the members 20, supporting members 12 and 13, spring suspensions and cylinders 30 rotating together. In order that the adjustment may take place through at least 180-degrees, the bar 47 is provided with arcuate offsets 48 to permit the lowering of the bar to the common center line between the pairs of supports 12—13, as indicated in dotted lines in Fig. 6.

Due to the locking connections 46 and the frictional attachments 22 between the members 20 and the outriggers 19, the adjusting mechanism 45—47 is maintained in adjusted position.

It will therefore be noted that I have provided a separator apparatus which has an improved adjustable full-floating spring suspension, together with means for vibrating the same at a plurality of points, whereby the separator is rendered highly efficient and capable of a fine selectivity of control of the separating action. Also, I have provided for the selective adjustment of the plane of vibration of the apparatus.

Various changes and modifications are contemplated within the scope of the following claims.

What I claim is:

1. In a material separator apparatus, a frame carrying a material-receiving element, spaced rotatable transverse members supporting the frame, cradle members disposed adjacent to the transverse members, rotatable suspension members carried by the cradle members, guides normal to the transverse members extending from the suspension members and slidably engaging the transverse members, springs separating the transverse members and suspension members and springs urging the transverse members toward the suspension members, said springs being opposed in axial alinement parallel to the guides, and a plurality of pneumatically operable vibrating units for vibrating the frame on said guides and springs, said suspension and transverse members coacting to simultaneously adjust the position of the guides and units independent of the position of the frame to change the plane of vibration thereof.

2. In a material separator apparatus, a pair of frames, members for supporting each of said frames, a multiple full-floating spring suspension for the frames including guides slidably engaging the supporting members of the frames for defining and effecting straight-line vibratory movement of the frames, springs for urging the frames toward and springs for urging the frames away from each other, means limiting said movements of the frames, and a vibrating unit connecting the suporting members of one frame with those of the other frame adjacent each guide.

3. In a material separator apparatus, a pair of separator decks, a multiple full-floating spring suspension therefor including spaced guides defining the direction of reciprocation of the decks irrespective of decks angle, springs urging the decks toward and springs urging the decks away from each other, and pneumatically operable vibrating units associated with each guide for vibrating the decks on the guides in opposite directions, said vibrating units disposed between the decks and adjustable with the guides to provide straight-line vibratory motion for the decks.

4. A material separator apparatus including a pair of superimposed decks, transverse alined supporting members for each deck arranged in pairs, independent spring suspensions for each of said pairs of members including a fixed support, guides on the support engaging and defining parallel movement of the members, springs opposing movement of the members in either direction on the guides, and pneumatically operable means for vibrating the decks in opposite directions on the guides connected with the alined supports.

5. A material separator apparatus including a pair of superimposed decks, common supports for the decks each including a transverse member engaging a deck, alined guides slidably engaged by the members for positively defining and permitting straight-line movement of a deck, means supporting the guides, a pair of springs resiliently suspending each member, the members of each common support being spaced apart, and a pair of vibrating units for each support for vibrating the members thereof in opposite directions on the guides, the direction of the applied vibration being parallel to the guides.

6. A material separator apparatus including a pair of superimposed decks, common supports for the decks each including a transverse member engaging a deck, alined guides slidably engaged by the members for positively defining and permitting straight-line movement of a deck, means supporting the guides, a pair of springs resiliently suspending each member, the members of each common support being spaced apart, and a pair of vibrating units for each support connected with the switch and vibrating the members thereof in opposite directions on the guides, said members and means supporting the guides being rotatable to vary the plane of vibration of both decks.

7. A material separator apparatus including a deck, a frame therefor having a pair of side members, a superimposed deck including a frame having a pair of side members, the side members of said decks having overlapping portions, a pair of supporting members extending transversely through the overlapping portions each secured to the said portions of a deck, springs urging said transverse members away from and toward each other, a vibrating unit adjacent each side of the apparatus directly connected to the transverse members for vibrating the decks in opposite directions, and guide means cooperating with said members for positively defining and permitting straight-line movement of a deck.

8. In a material separator apparatus, an upper and a lower deck each including side members having overlapping portions adjacent their ends, pairs of transverse supporting members extending through and outwardly beyond the overlapping portions, means securing one transverse member of each pair to opposite overlapping portions of one deck, means securing the other transverse member to the overlapping portions of the other deck, both of said means permitting a limited relative movement of said members and decks toward and away from each other, a pair of outriggers extending longitudinally of the apparatus, spaced suspension members carried thereby and extending between the outer ends of the pairs of transverse members, alined guides carried by said suspension members and extending through the transverse members, guide bushings on the transverse members slidably engaging the guides, springs between each transverse member and suspension support, springs externally of and engaging the transverse members, means for adjusting the springs for resiliently supporting the transverse members and decks, and vibrating units adjacent the ends of the transverse members for vibrating the decks in opposite directions.

9. In a material separator device, a frame including side members, transverse supporting members extending through and outwardly beyond the side members, outriggers extending longitudinally of the frame, spaced suspension members carried thereby and extending inwardly beyond the outer ends of the transverse members, alined guides carried by said suspension members and extending through the transverse members, guide bushings on the transverse members slidably engaging the guides, alined springs opposing movement of the bearings and frame in opposite directions on the guides, said springs providing a full-floating resilient support for the frame, and a separate vibrating unit supported by the frame adjacent each of said guides, said vibrating units having straight-line reciprocating movement in a direction parallel to said guides.

THOMAS HUBBARD MORGAN.